Aug. 25, 1970    I. C. CHEESEMAN    3,525,577

PROPELLERS

Filed April 19, 1968    4 Sheets-Sheet 1

Aug. 25, 1970  I. C. CHEESEMAN  3,525,577
PROPELLERS

Filed April 19, 1968  4 Sheets-Sheet 3

United States Patent Office 3,525,577
Patented Aug. 25, 1970

1

3,525,577
PROPELLERS
Ian Clifford Cheeseman, Camberley, Surrey, England, assignor to Minister of Technology in Her Britannic Majesty's Government of the United Kingdom of Great Britain and Northern Ireland, London, England
Filed Apr. 19, 1968, Ser. No. 722,633
Claims priority, application Great Britain, Apr. 20, 1967, 18,141/67
Int. Cl. B64c 27/18; B63h 7/02
U.S. Cl. 416—90                                13 Claims

ABSTRACT OF THE DISCLOSURE

A propeller has circular cross-section blades on which thrust may be induced by discharging thin streams of air tangentially over their outer surfaces. Air passes to the blades through an annular channel concentric with the propeller axis, and in two sections each having valve controlled ports to vary the airflow and thus the amount of thrust. The valves may be operated differentially to cut off air to the blades cyclically over one rotational phase to give an unbalanced thrust force about the propeller axis. The propeller is carried on a pivot about which it may be turned by such a force.

The invention relates to propellers for vehicle propulsion.

Air-cushion vehicles are in the main propelled by variable-pitch propellers as used in aircraft. In many cases such propellers are mounted on pylons which may be turned about a vertical axis to give directional control of the vehicle by varying the relative line of thrust.

In general, such propellers are inefficient at the low tip speeds which are dictated by noise considerations, great difficulty being experienced in designing blades which are efficient over the required speed range. Additionally, the large twist of the blades which is dictated by thrust and speed requirements in the forward direction (for example, 20 to 25°) makes them unsuitable for backward thrust generation—equal forward and backward thrust being desirable. Where the low tip speed leads to large diameter propellers, the flexibility of the blades can lead to difficulties in mounting the propeller, due to the large overhang necessary at the hub to obviate the blades striking the pylon when deflected by thrust forces.

So far as directional control is concerned, it has been proposed to vary the pitch of propeller blades cyclically between positive and negative pitch positions. However, this involves a cyclic control having parts which are in rapid motion during operation with consequent wear and need for maintenance.

The invention provides a propeller unit comprising at least two blades attached to a hub member which is mounted for rotation about a substantially horizontal axis and arranged to pivot about another axis substantially normal to the axis of rotation, and at least one spanwise-extending aperture formed in the surface of each blade for the discharge of a fluid stream over the blade surface.

In a preferred form of the invention, thrust may be varied cyclically relative to the axis of a pylon on which the hub member is mounted.

According to one form of the invention, at least two

2 apertures are formed in each blade and arranged so that the discharge of fluid streams from them induces thrust forces acting in different directions, and a control is provided whereby fluid may be selectively directed to the apertures for discharge therefrom.

The invention enables high lift (or thrust) coefficients to be obtained, even with circular or near-circular blade sections, and low tip speeds can be used while still maintaining a good thrust efficiency. The high stiffness inherent in a circular section blade enables the size of the propeller to be increased without a marked increase in propeller hub overhang.

Figure 1:
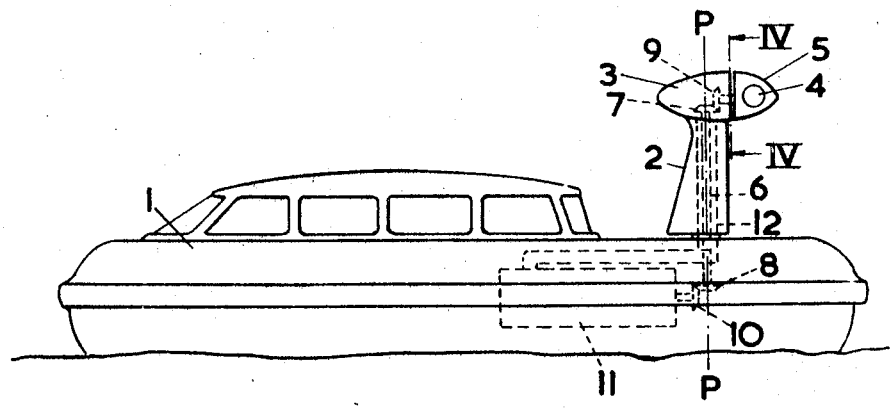
Figure 2:
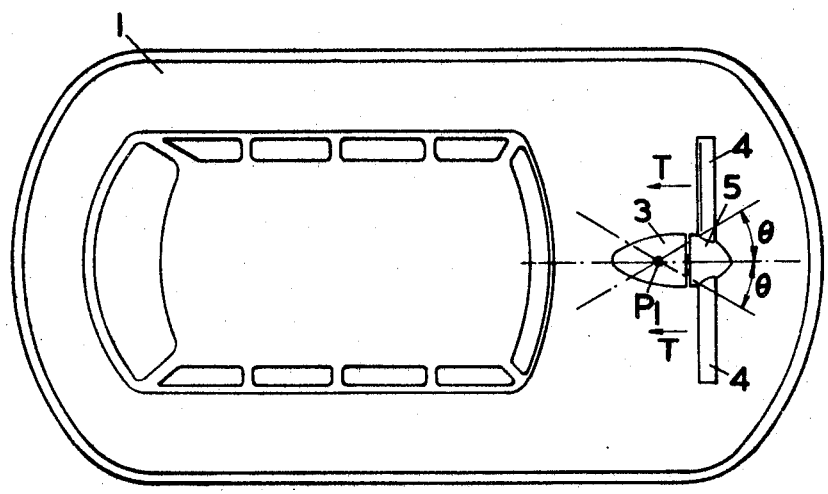
Figure 3:
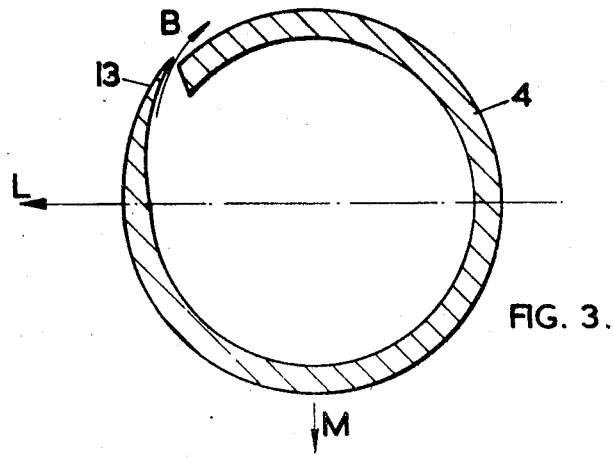
Figure 4:
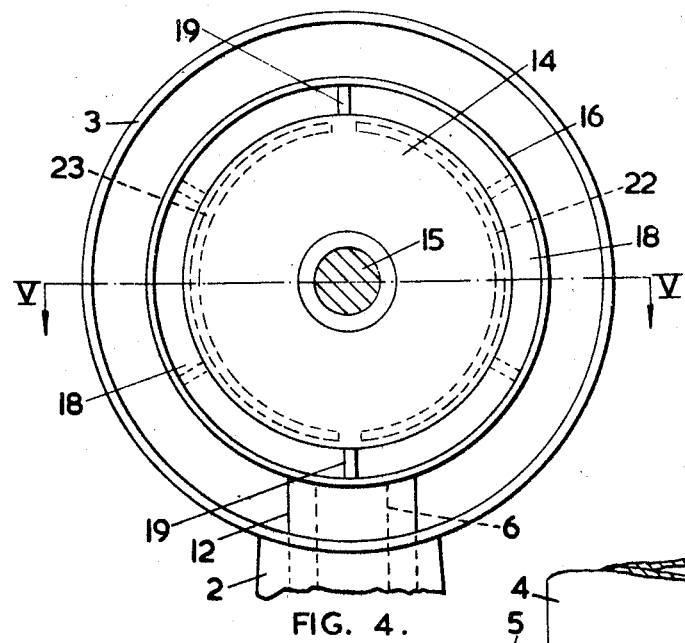
Figure 5:
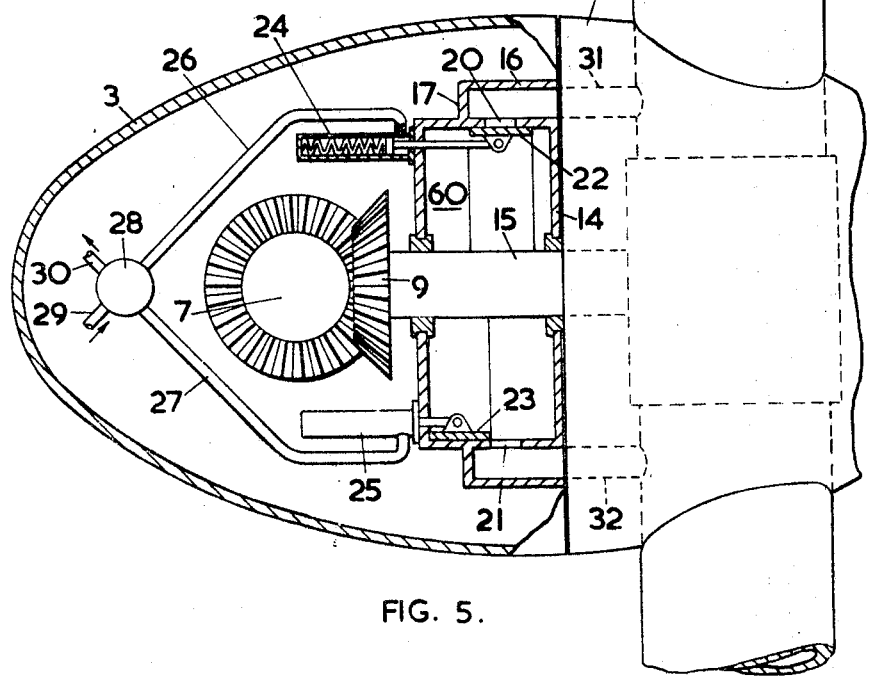
Figure 6:
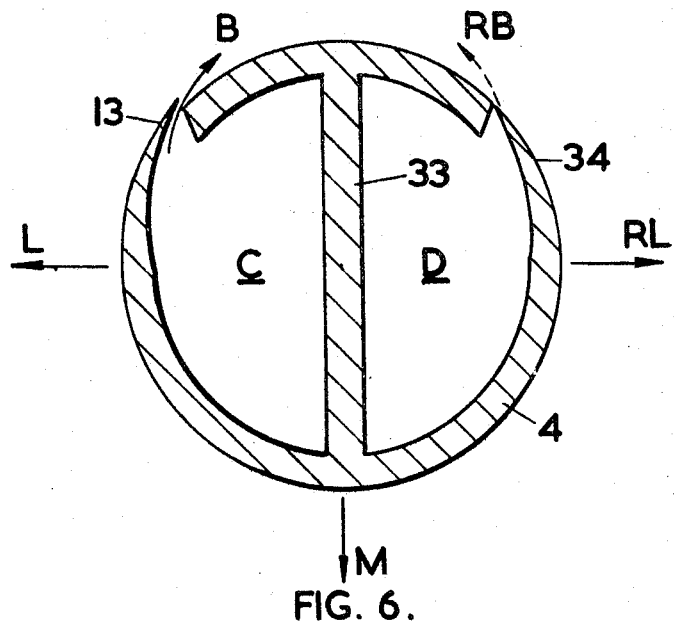
Figure 9:
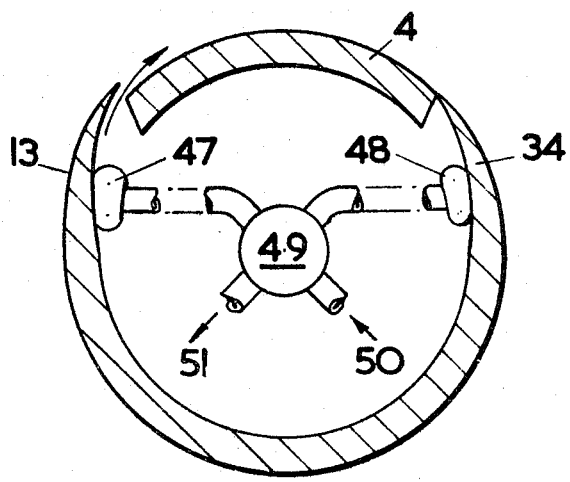
Figure 7:
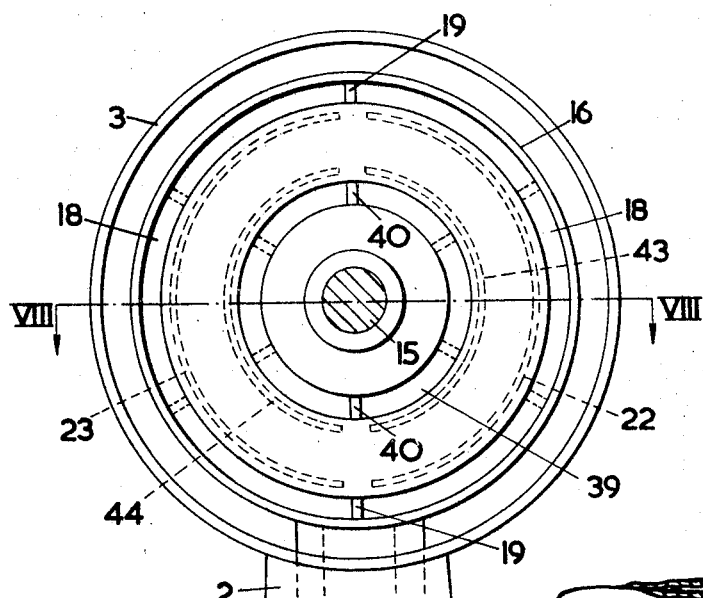
Figure 8:
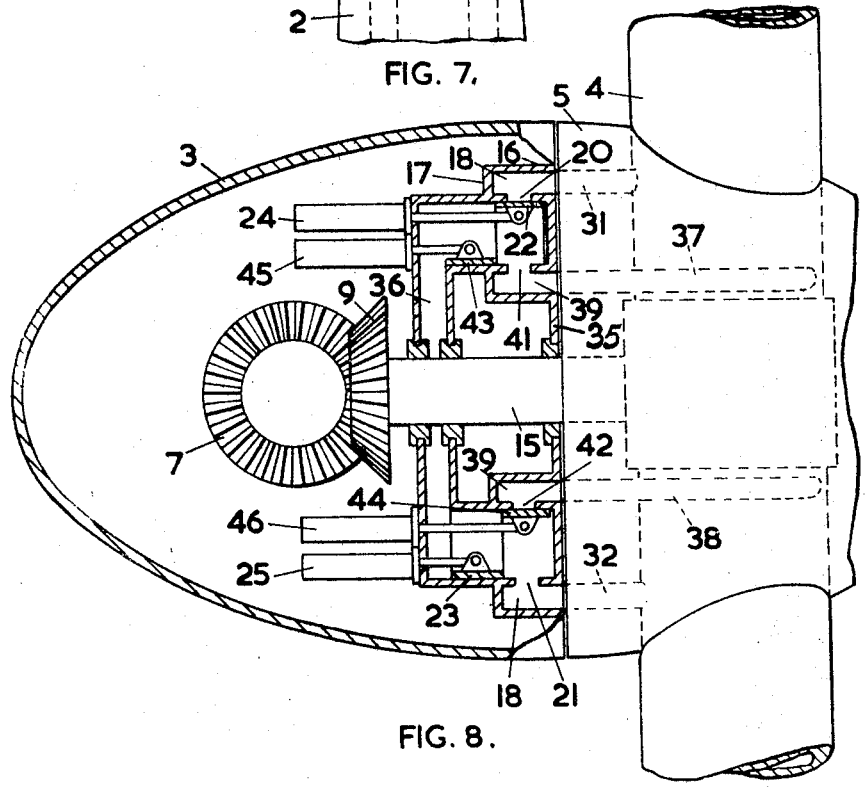

Some embodiments of the invention will now be described by way of example with reference to the accompanying diagrammatic drawings, of which:

FIG. 1 is a side elevation of an air-cushion vehicle having a propeller unit according to the invention, FIG. 2 is a plan view of the vehicle of FIG. 1, FIG. 3 is a transverse section through a propeller blade, FIG. 4 is an end elevation of a housing forming part of the hub assembly of a propeller unit, together with its casing, taken on the line IV—IV in FIG. 1, FIG. 5 is a section through the aforesaid housing and casing taken on the line V—V in FIG. 4 and showing part of the propeller blades and their spinner, FIG. 6 is a transverse section corresponding to FIG. 3 through another propeller blade, FIG. 7 is a view corresponding to FIG. 4 showing another form of housing, FIG. 8 is a view corresponding to FIG. 5 taken on the line VIII—VIII in FIG. 7, and FIG. 9 is a transverse sectional view of part of a propeller blade together with an associated control.

FIGS. 1 and 2 show an air-cushion vehicle 1 with a vertical pylon 2 mounted on the main structure of the vehicle towards its rear end and extending upwardly. A streamline casing 3 carried at the upper end of the pylon encloses part of the hub assembly (not shown in detail) of a propeller having two blades 4 of circular cross section rigidly attached to a hub member rotatable about a horizontal axis, and enclosed within a spinner 5. The pylon 2 is pivoted on the main structure of the vehicle so that it may be turned freely about its axis, denoted by the line P—P in FIG. 1, together with the propeller, the axis of which may thus be varied relative to the vehicle, as, for instance, indicated by the angles $\theta$ in FIG. 2 relative to the pivot point $P_1$, alternative typical locations of the axis being indicated in dotted lines.

A spanwise-extending aperture is formed in the surface of each blade, the surface itself being extended over the aperture, as may be seen from FIG. 3, in the form of a spring flap 13 which serves to close the aperture except as will appear later.

The aperture is directed rearwardly with respect to the direction of rotation of the blade, indicated by the arrow M, and is located in what may be termed the front trailing quadrant of the blade (i.e., that quadrant of the trailing half of the blade relative to its direction of rotation which is located at the front of the blade in the sense that the propeller as a whole will move along its axis).

A shaft 6 extends along the axis of the pylon 2 and has bevel gears 7, 8 at its upper and lower ends respectively. The upper bevel 7 meshes with a bevel gear 9 connected to the rotatable hub member of the propeller, while the lower bevel 8 meshes with a bevel gear 10 mounted on the output shaft of a gas turbine engine 11 carried in the body of the vehicle. Air tapped from the compressor of the engine is led into the casing 3, for use as will be explained later, by way of a duct 12 disposed coaxially about the shaft 6.

Reference will now be made to FIGS. 4 and 5. The casing 3 encloses an annular housing 14 which supports a shaft 15 by which the bevel gear 9 is connected to a rotatable hub member. The interior of the housing 14 constitutes a plenum chamber 60 having a connection (not shown) to the duct 12. A circumferential wall 16 is supported coaxially about the housing 14 by a radially extending wall 17 to define an annular channel 18 which is divided circumferentially into two equal sections by radial partitions 19 extending between the housing 14 and the wall 16 at top and bottom along the axial vertical plane of the assembly. Ports 20, 21 in the housing 14 connect the plenum chamber 60 with the two sections of the annular channel 18. Circumferentially-extending slide valves 22, 23 can be moved axially over the ports by hydraulic jacks 24, 25 so that the ports may be opened or closed to the plenum chamber. The hydraulic jacks 24, 25 are spring-biased to move the slide valves 22, 23 towards the closed positions of the ports 20, 21. The application of hydraulic pressure via pipelines 26, 27 acts against the spring pressure to open the ports. The jacks are controlled by means of a three-way valve 28 which may be opened to admit pressure fluid from a supply line 29 to both jacks simultaneously or to supply pressure fluid to one jack whilst connecting the pipeline of the other to a return line 30. In this way one port may remain closed (as is the case with port 20 in FIG. 5) while the other is opened (as port 21), its valve being capable of movement to vary the port area.

The interiors of the blades are hollow and serve as ducts connecting the apertures in the blade surfaces with transfer ports 31, 32 (shown dotted in FIG. 5), one for each blade, which are provided in the rotating hub member and have entries which ride over the annular channel 18.

Thus, with the valves 22, 23 in the open position, air supplied to the plenum chamber 60 will flow into the annular channel and thence via the transfer ports to the blades. The pressure of the air acting on the spring flaps 13 closing the blade apertures causes these to lift and direct the air as thin layers tangentially over the surfaces of the rearward part of each blade, as indicated by the arrow B in FIG. 3. This has the effect of modifying the circulation which exists around the blades during rotation thereby producing aerodynamic lift, which acts in the direction of the arrow L in FIG. 3 and which is transmitted to the structure of the vehicle through the propeller and pylon as a propulsive thrust. Movement of the valves in unison across their respective ports will vary the flow of air to the blades and thus the amount of thrust. The thrust T (see FIG. 2) produced by each blade will be the same, or substantially so, during all phases of rotation.

If one of the ports 20, 21 is closed whilst the other remains open, no air will flow from the plenum chamber to that section of the annular channel 18 fed by the first mentioned port and thus no air will be discharged from the apertures in the blades whilst the transfer ports 31, 32 are traversing this section of the channel. Consequently no thrust will be generated during this phase of rotation. The air passing through the other section of the channel however, will cause thrust to be generated as before during the remaining phase of blade rotation. As a result, an unbalanced thrust force will act on one side of the axis of the pylon causing the latter to rotate about its pivot. By opening the first mentioned port, air passes through the blade apertures during all phases of rotation once more and lift becomes balanced about the axis of the pylon which ceases to turn. However, the direction of thrust has been altered relative to the vehicle to which a moment will consequently be applied causing a directional change of heading.

The pylon may be turned through 180° before symmetrical blade lift is re-applied, in which case the craft will be propelled in the reverse direction, the maximum thrust available being as before.

It is felt that it may be desirable to be able to apply reverse thrust more rapidly than might be the case where turning of the pylon is involved. In a variation of the embodiment already described, the blades are divided internally into two passages C, D, as shown in FIG. 6, by a longitudinal partition 33. A rearwardly-directed aperture having a spring flap 13 is formed in each blade as previously and communicates with the passage C. A further aperture of similar construction having a spring flap 34 is provided, also in the trailing half of the blade relative to its rotation and discharging rearwardly but this time in the rear quadrant with respect to the direction of movement of the propeller as a whole. The second aperture is connected to the passage D within the blade.

The hub arrangement of this variation is shown in FIGS. 7 and 8 in which the same reference numerals as in FIGS. 4 and 5 are used to indicate corresponding components. An annular housing 35 disposed within a casing 3 supports a shaft 15 which transmits the drive from bevel gear 9 to the rotatable hub member as before whilst an annular channel 18 is defined about the housing as before by walls 16, 17. The annular channel is again divided circumferentially by partitions 19 and communicates with a plenum chamber 36 by way of ports 20, 21 in the housing wall again as before, the ports being opened and closed by the movement of slide valves 22, 23 operated by hydraulic jacks 24, 25. Similarly, transfer ports 31, 32 serve to connect the annular channel 18 with the interiors of the blades, but this time only with the passage C in each case. The passages D are connected by additional transfer ports 37, 38 to a second annular channel 39 formed in the housing 35 radially inwardly of the annular channel 18 and concentric with it. The annular channel 39 is also divided circumferentially by radial partitions 40 on the same alignment as the partitions 19. The two sections of the annular channel 39 communicate with the plenum chamber 36 by way of ports 41, 42 in the walls of the housing 35. These ports are opened and closed by slide valves 43, 44 operated by hydraulic jacks 45, 46 in similar fashion to the slide valves 22, 23.

Fluid connections (not shown) to the jacks 24, 45 are arranged so that only one can be operated to open its associated port at any one time, the other port remaining closed. A similar arrangement applies to the jacks 25, 46. Thus, if the ports to the inner annular channel 39 are open, the ports to the outer annular channel 18 must be closed, and vice versa. The control arrangement for the jacks is also arranged to enable an inner and an outer port on opposite sides of the assembly to be open, the other two remaining closed as is shown in FIG. 8.

To generate lift on the blades so as to produce a forward thrust on the vehicle, the ports 41, 42 are closed and the ports 20, 21 opened. Air flows from the plenum chamber to both sections of the outer annular channel 18 and thence via the transfer ports 31, 32 to the passages C in the blades to be discharged from the apertures in the fronts of the blades, as indicated by the arrow B in FIG. 6. Reversal of thrust is effected by closing the ports 20, 21 and opening the ports 41, 42 when air will flow to the inner annular channel 39 and via transfer ports 37, 38 to the passages D in the blades to be discharged from the apertures in the rear of the blades as indicated by the arrow RB in FIG. 6, the resultant lift acting in the direction indicated by the arrow RL. Thus, a full thrust reversal can be made almost instantaneously.

Directional control may be applied as before by cutting off air supply to one section of the appropriate annular channel to create an unbalanced lift force about the axis of the pylon and causing it to rotate about its pivot. A more rapid response in this respect can be obtained by supplying air to one section of the outer annular channel 18 and to the diametrically opposite section of the inner annular channel 39 thus producing a forward thrust over one-half of the disc swept by the propeller and reverse thrust over the other half of the disc, these, of course, being located on opposite sides of the pivot axis of the pylon.

In both embodiments, the cyclic transition between differing conditions of air supply to the blades (i.e., corresponding to thrust and no-thrust, or forward and reverse thrust) is extremely abrupt. A more gradual change may be obtained by further subdividing the annular channels, as indicated by dotted lines in FIGS. 4 and 7, with corresponding divisions in the respective ports by which air flows to the channels, the divisions in this case differing in area or, alternatively each having a separate section of slide valve differentially operable.

Thus a maximum rate of flow could exist at the midpoint of a half-channel, being progressively reduced in both directions.

Thrust reversal is also obtainable with the hub assembly shown in FIGS. 4 and 5 by the use of modified blades as shown in FIG. 9. In this case the blade is not divided internally but has two oppositely-directed apertures closed by spring flaps 13, 34 as in FIG. 6. Air sacs 47, 48 respectively bear on the under side of each spring flap and may be connected to a suitable source of air pressure through a control valve 49. Operation of the valve connects one or the other of the sacs to a pressure line 50. The admission of air to a sac causes it to expand and move its associated spring flap outwardly from the blade surface to open the aperture. On release of the air pressure, the spring flap will act to close the aperture again. Thus, air discharged from whichever aperture is opened will cause a thrust to be generated in one direction or the other. This particular arrangement can, of course, be used to generate opposite thrusts on different sections of the propeller swept disc simultaneously, though with some complication.

In blades as disclosed in FIG. 3 and FIG. 6 it is possible that the pressure of air supplied to the blade interiors might be insufficient to open the spring flaps, or to open them enough to permit discharge of adequate volumes of air. Since it is desirable for aerodynamic reasons that the apertures remain closed except when actually in use, some other means of opening them will be required and air sacs can be used for this purpose.

The foregoing has been concerned with propellers operating in a gaseous fluid, i.e., air, but can be readily applied to propellers operating in water in which case the fluid stream discharged from the blade apertures would probably also be of water. It is believed that the use of air discharged in such circumstances might lead to cavitation problems but it is not completely ruled out. The use of a vapour such as steam which will be condensed by the surrounding water is also envisaged.

A single propeller unit as described should be adequate to propel a craft of medium size and provide all the control required for manoeuvring. However, limitations of space, power available, and other considerations might make more than one unit necessary.

Where directional stability is something of a problem, as is particularly the case with air-cushion vehicles, the invention suggests itself as being highly suitable for automatic control whereby directional changes may be sensed and corrections readily applied.

From the point of view of mechanical efficiency, the propeller would preferably be mechanically driven. As an alternative to the indirect, gear drive already disclosed, a gas turbine engine is enclosed in a power pod mounted on a pylon and coupled directly to the propeller shaft. However, there is no fundamental objection to tip jet drive which could be readily accommodated and, with the blade sizes which can be envisaged, substantial internal ducts can be provided to pass a large mass flow and no noise problem should result.

I claim:

1. A propeller unit mounted to pivot about an axis and comprising at least two blades mounted for rotation about another axis substantially normal to the pivot axis, at least one spanwise-extending aperture formed in the surface of each blade, fluid supply means connected to supply fluid to the blade apertures for discharge therefrom, the apertures being so shaped and arranged as to discharge thin layers of fluid over the blade surfaces whereby lift forces will be induced thereon to give propulsive thrust, and means for selectively turning the propeller axis of rotation about the pivot axis by varying the fluid discharge cyclically in accordance with rotation of the blades to vary the distribution of propulsive thrust relative to the pivot axis.

2. A propeller unit according to claim 1 further comprising a housing including an annular channel divided circumferentially into at least two sections which are disposed symmetrically about the pivot axis, means for supplying fluid from the fluid supply means to the channel, transfer ports for conveying fluid from the channel to the blades for discharge therefrom, and means for interrupting fluid flow to one section of the annular channel at a time.

3. A propeller unit according to claim 2 wherein the means for interrupting fluid flow comprises ports connecting the sections of the annular channel to the fluid supply means, and valves operable to close the ports individually.

4. A propeller unit according to claim 3 further comprising control means for operating the valves collectively to vary the areas of the ports.

5. A propeller unit according to claim 1 having at least two spanwise-extending apertures formed in each blade, the apertures being so arranged and directed as to discharge the thin layers of fluid over the surface of each blade to induce thrust forces acting in substantially opposite directions, and control means for selectively directing fluid to one aperture in each blade.

6. A propeller unit according to claim 2 comprising a second annular channel concentric with the first-mentioned channel, means for supplying fluid from the fluid supply means to the second annular channel, two spanwise-extending apertures in each blade so shaped and arranged as to discharge the thin layers of fluid over the blade surface to induce thrust forces acting in substantially opposite directions along the axis of rotation, the apertures in each blade being connected to separate transfer ports, each arranged to receive fluid from one annular channel, and means for interrupting fluid flow to the second annular channel.

7. A propeller unit according to claim 6 wherein the second annular channel is divided circumferentially in similar manner to the first-named annular channel and the means for interrupting fluid flow to the second annular channel, is operable in respect of one section at a time.

8. A propeller unit according to claim 7 wherein means are provided to prevent simultaneous supply of fluid to corresponding sections of the annular channels.

9. A propeller unit according to claim 7 wherein the means for interrupting fluid flow to the second annular channel comprises ports connecting the sections of the second annular channel to the fluid supply means, and valves operable to close the ports individually.

10. A propeller unit according to claim 9 wherein the valves are operable collectively to vary the areas of the ports.

11. A propeller unit according to claim 1 having spring flaps to close the apertures and so arranged as to be opened by the application of fluid pressure.

12. A propeller unit according to claim 5 having spring flaps to close the apertures, and control means so arranged as to effect the opening of not more than one spring flap at a time.

13. A propeller unit according to claim 1 in which the blades are substantially circular in cross-section.

References Cited

UNITED STATES PATENTS

| | | |
|---|---|---|
| 2,621,001 | 12/1952 | Roman _____ 170—135.4 X |
| 2,774,552 | 12/1956 | Glad. |
| 2,972,327 | 2/1961 | Paul. |
| 3,109,494 | 11/1963 | Davidson et al. _____ 170—135.4 |
| 3,139,936 | 7/1964 | Davidson et al. _____ 170—135.4 |
| 3,155,341 | 11/1964 | Girard. |
| 3,187,817 | 6/1965 | Colley _____ 170—135.2 |
| 3,246,861 | 4/1966 | Curci. |
| 3,348,618 | 10/1967 | Flint et al. _____ 170—135.4 |
| 3,404,737 | 10/1968 | Keder _____ 170—135.22 |

EVERETTE A. POWELL, JR., Primary Examiner

U.S. Cl. X.R.

416—93, 149